United States Patent
Yun et al.

(10) Patent No.: US 7,045,176 B2
(45) Date of Patent: May 16, 2006

(54) LIQUID CRYSTAL COMPOSITION HAVING HIGH-SPEED RESPONSE PROPERTY AND LIQUID CRYSTAL DISPLAY USING THE SAME

(75) Inventors: Yong-Kuk Yun, Suwon (KR); Bong-Hee Kim, Goyang (KR); Bong-Sung Seo, Seongnam (KR); Byeong-Seob Ban, Yongin (KR)

(73) Assignee: Samsung Electronics Co., Ltd., Kyunggi-do (KR)

( * ) Notice: Subject to any disclaimer, the term of this patent is extended or adjusted under 35 U.S.C. 154(b) by 0 days.

(21) Appl. No.: 10/721,323

(22) Filed: Nov. 26, 2003

(65) Prior Publication Data

US 2004/0119051 A1    Jun. 24, 2004

(30) Foreign Application Priority Data

Nov. 28, 2002  (KR) ............... 10-2002-0074738
Nov. 28, 2002  (KR) ............... 10-2002-0074739
Nov. 28, 2002  (KR) ............... 10-2002-0074740
Nov. 28, 2002  (KR) ............... 10-2002-0074741

(51) Int. Cl.
*C09K 19/30* (2006.01)
*C09K 19/34* (2006.01)
*C09K 19/12* (2006.01)
*C09K 19/20* (2006.01)

(52) U.S. Cl. ............. 428/1.1; 252/299.61; 252/299.63; 252/299.66; 252/299.67

(58) Field of Classification Search ............... 428/1.1; 252/299.61, 299.63, 299.66, 299.67
See application file for complete search history.

(56) References Cited

U.S. PATENT DOCUMENTS

| | | | | |
|---|---|---|---|---|
| 4,970,022 A | * | 11/1990 | Scheuble et al. | 252/299.61 |
| 6,716,491 B1 | * | 4/2004 | Tarumi et al. | 428/1.1 |
| 6,815,017 B1 | | 11/2004 | Heckmeier et al. | 428/1.1 |
| 2002/0030180 A1 | * | 3/2002 | Tarumi et al. | 252/299.61 |

FOREIGN PATENT DOCUMENTS

| | | | |
|---|---|---|---|
| DE | 10133867 | * | 4/2002 |
| JP | 2000/12871 | * | 1/2002 |

OTHER PUBLICATIONS

English translation by computer for JP 2002-12871, http://www4.ipdl.jpo.go.jp/Tokujitu/PAJdetail.ipdl?N0000=60&N0120=01&N2001=2&N3001=2002-012871.*

* cited by examiner

*Primary Examiner*—Shean C. Wu
(74) *Attorney, Agent, or Firm*—McGuireWoods LLP

(57) ABSTRACT

The present invention relates to a liquid crystal composition having a high-speed response property and a liquid crystal display using the same, more particularly to a liquid crystal composition, wherein the liquid crystal has a high phase transition temperature, large birefringence index and modulus of elasticity, and a wide operable nematic temperature range, so that a high-speed response can be obtained to be useful for many liquid crystal devices including LCDs, and a liquid crystal display using the same.

25 Claims, No Drawings

LIQUID CRYSTAL COMPOSITION HAVING HIGH-SPEED RESPONSE PROPERTY AND LIQUID CRYSTAL DISPLAY USING THE SAME

BACKGROUND OF THE INVENTION (a) Field of the Invention

The present invention relates to a liquid crystal composition having a high-speed response property and a liquid crystal display using the same, and more particularly to a liquid crystal composition wherein the liquid crystal has a high phase transition temperature, a large birefringence index and modulus of elasticity, and a wide operable nematic temperature range, so that a high-speed response can be obtained to be useful for many liquid crystal devices including LCDs, and a liquid crystal display using the same.

(b) Description of the Related Art

Liquid crystal displays (LCDs) emerged in the early 1970s as display devices for electronic calculators and digital clocks. From word processors and PDAs (personal digital assistants) to notebook PCs, desktop PCs, and TVs, they are now pervading our daily lives. The LCD industry is growing into a huge-scale industry. For a TFT liquid crystal display to be commercially viable in the TV market and to expand its market share, visibility of moving pictures, high brightness, and high-speed response are very important factors.

A liquid crystal is a fluid having optical/dielectric anisotropy. When it is used for a liquid crystal display (LCD), it changes a phase difference of light depending on the voltage applied to a cell, the basic unit of the LCD, due to its optical anisotropy, and thus displays an image. Typical examples of LCD modes are DS (dynamic scattering) mode, TN (twisted nematic) mode, STN (supertwisted nematic) mode, IPS (in-plane switching) mode, OCB (optically compensated bend) mode, and VA (vertical alignment) mode. Currently, the mainstream LCD is a TFT (thin film transistor) LCD, which belongs to the active matrix category.

For a liquid crystal to be used in an LCD, it should have good chemical resistance, photochemical resistance, and heat resistance, and good resistance to electric fields and electromagnetic interference. Also, it should have low viscosity, low threshold voltage, and high contrast, and its operation temperature should be as wide as possible, including below and above room temperature. Additionally, it should have good compatibility in general, since the liquid crystal is mixed with other components. In sum, a liquid crystal having suitable physical properties is required to obtain a high quality LCD. Basically, a liquid crystal requires the following physical properties to be used for an LCD.

First, it should have a wide nematic temperature range. Its melting point should be at least below −20° C. For most nematic liquid crystal mixtures, the nematic phase is maintained even at −40° C., and the phase transition temperature is over 80° C. Recently, as the nematic liquid crystal mixture has been applied to TVs using direct backlights, its phase transition temperature should be over 90° C.

Second, it should have a high specific resistance. Because the liquid crystal functions as a dielectric or a capacitor in the LCD, it should have a high resistance. For a TFT LCD, the specific resistance should be over 1012 Ω cm.

Third, its refractive index anisotropy should be about 0.07 to 0.1, depending on arrangement status of the liquid crystal, operating conditions, contrast ratio, view angle, and so forth of the electro-optical display to be used.

Fourth, the liquid crystal mixture should have a dielectric anisotropy for low-voltage operation, as can be seen from Equation 1. Also, the nematic liquid crystal mixture should have a suitable modulus of elasticity considering the response time. For a liquid crystal mixture used in a notebook PC or a monitor, the threshold voltage is about 1.5 to 2.0 V.

$$V_{th} = \pi \sqrt{\frac{K}{\varepsilon_0 \Delta \varepsilon}} \qquad \text{Equation 1}$$

Wherein $V_{th}$ is the threshold voltage, $\Delta \varepsilon$ is the dielectric anisotropy, and K is the modulus of elasticity.

An LCD used for mobile products should be able to be operated at a low voltage for longer battery use. For the low-voltage operation, a liquid crystal having a high dielectric constant and high phase transition temperature is required.

The TFT liquid crystal display is widely used for telecommunications devices because of its thinness, light weight, and low power consumption. The TFT LCD market is gradually expanding, and they have recently been replacing LCDs in liquid crystal monitors and liquid crystal desktop PCs. Therefore, demand for LCDs is increasing more and more.

Currently, the active matrix liquid crystal display is being spotlighted as a new display capable of replacing CRTs because of its high resolution, high contrast ratio, thinness, and light weight. The liquid crystal displays, which have long been used for electronic calculators, PDAs, and notebook computers, are extending their territory to monitors and liquid crystal TVs. One technical objective to handle ever increasing high-quality, high-capacity display data, and to attain superior moving picture display characteristics, is to develop a liquid crystal composition having a high-speed response property.

Variables of a liquid crystal composition related to the response property of a liquid crystal display have the following relationships.

Equation 1

$$\tau_{on} \propto \frac{\gamma d^2}{\varepsilon_0 \Delta \varepsilon (V^2 - V_{th}^2)}$$

Equation 2

$$\tau_{off} \propto \left(\frac{d}{\pi}\right)^2 \frac{\gamma_1}{K_{eff}}$$

Wherein, $\gamma$ is the rotational viscosity, d is the cell gap, $\varepsilon_0$ is the dielectric constant, $\Delta \varepsilon$ is the dielectric anisotropy ($\Delta \varepsilon = \varepsilon_{81} - \varepsilon_\perp$), V is the operating voltage, $V_{th}$ is the threshold voltage of Frederick's transition, and $K_{eff}$ is the effective elastic constant.

From above equations, it can be understood that the response time can be decreased by reducing the rotational viscosity or increasing the elastic constant of a liquid crystal composition. However, if the rotational viscosity is reduced to improve the response time, the elastic constant and the isotropization temperature (TNI) of the liquid crystal also decrease. And, if the elastic constant is increased, the threshold voltage ($V_{th}$) and the rotational viscosity tend to increase. Therefore, a trade-off relationship of the two properties should be minimized to improve the response time.

Most of the currently released or commercially available liquid crystal displays have a response time of longer than 25 ms, which falls short of the time needed to handle moving pictures (about 17 ms, corresponding to one frame). Moreover, the response time should be shorter than 10 ms for practical applications. Although customers don't require such a short response time as yet, it should be attained for the LCD-TV market to grow and for LCDs to win the competition with PDPs and organic EL displays. However, it seems to be very difficult to attain a response time shorter than 10 ms by only improving the liquid crystal properties. Therefore, improvements of the device itself should be accompanied by improvements of liquid crystal properties. In this regard, the most practically accessible approach is to reduce the cell gap of the panel and to develop a liquid crystal appropriate for such a panel. When reducing the cell gap, the refractive index anisotropy of the liquid crystal should be increased considering the view angle and brightness, or the optimal $\Delta$nd. In general, if the refractive index anisotropy of a liquid crystal is increased, the rotational viscosity, the elastic constant, and the dielectric anisotropy increase. That is, the factors related to reduction of the response time influence one another. Therefore, development of a new nematic liquid crystal with a lesser trade-off relationship is required.

Growth of the TFT LCD TV market is expected. For the TFT liquid crystal display to have a share in the TV market and to expand it, visibility of moving pictures, high brightness, and high-speed response are very important factors. For high brightness and prevention of liquid crystal deterioration, the phase transition temperature of the liquid crystal should be maintained higher, considering a temperature increase by the tube current of backlights, etc. For high-speed response, the rotational viscosity can be reduced or the cell gap can be decreased to increase the refractive index of the liquid crystal.

The TN (twist nematic) LCD has continuously extended its territory in the display field. It is extending its territory to notebook PCs and TV monitors, and small-to-medium household products. As the LCD-TV market matures and expands, high brightness and high-speed response are emerging as very important factors. For high brightness, the phase transition temperature of the liquid crystal should be maintained higher, considering a temperature increase by the tube current of backlights, etc. TN, IPS (CE), and VA modes are considered as possible TV products. Although the IPS (CE) and VA modes have a wide view angle, the response time is too slow to properly handle moving pictures. Although the TN mode has a narrow view angle, it will be the most competent TV mode in terms of capacity and productivity, if the view angle is improved by a compensation film and if the response time is improved. However, the currently available TN liquid crystal has a low phase transition temperature of about 80° C.

To solve these problems, the following conditions should be satisfied. First, the viscosity of the liquid crystal should be decreased to 20 to 25 mm²/s to improve the response time. Second, the dielectric anisotropy ($\Delta\in$) should be increased to 10 to 15 (35° C., 1 kHz) to reduce the operating voltage. Third, the nematic phase should be maintained in a wide temperature range, preferably in a temperature range of −30 to 80° C. Fourth, the birefringence index ($\Delta$n) should be equal to or greater than 0.20 (25° C.).

As described above, a variety of LCD products are being produced in TN, IPS, and VA modes. Most of them use nematic liquid crystals, whose phase transition temperature is about 70 to 80° C., and response time is about 20 to 30 ms.

Accordingly, improvement of response time and increase in phase transition temperature are urgently needed.

SUMMARY OF THE INVENTION

It is an object of the present invention to provide a low-voltage nematic liquid crystal composition offering high brightness and high-speed response, which comprises a liquid crystal having a high phase transition temperature and an increased refractive index anisotropy.

It is another object of the present invention to provide a high-speed response liquid crystal composition capable of handling moving pictures, which has a wide liquid crystal temperature range, low threshold voltage, and dielectric anisotropy ($\Delta\in$) equal to or larger than 5.

It is still another object of the present invention to provide a liquid crystal composition having large refractive index anisotropy ($\Delta$n), large elastic constants ($K_{11}$, $K_{33}$), large dielectric anisotropy ($\Delta\in$), and low rotational viscosity so as to attain a fast response time, and having a voltage holding ratio sufficient to be applied to an active matrix in a liquid crystal display.

It is still another object of the present invention to provide a liquid crystal display using the liquid crystal composition.

DETAILED DESCRIPTION OF THE PREFERRED EMBODIMENTS

To attain the objects, the present invention provides a nematic liquid crystal composition comprising a nematic liquid crystal compound represented by the following Chemical Formula 1:

Chemical Formula 1

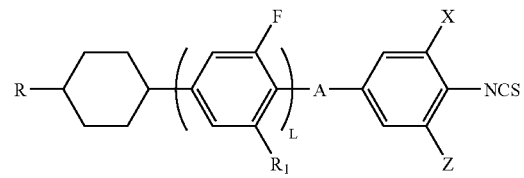

Here, R is $C_nH_{2n+1}O$, $C_nH_{2n+1}$, or $C_nH_{2n-1}$, wherein n is an integer of 1 to 15; $R_1$ is H or F; L is an integer of 0 to 2; A is a single bond, —$CH_2CH_2$—, —COO—, —C=C—, or —C≡C—; X is H, F, Cl, or Br; Z is H, F, Cl, or Br; and at least one of X and Z is F.

The present invention also provides a nematic liquid crystal composition comprising a nematic liquid crystal compound represented by the following Chemical Formula 5:

Chemical Formula 5

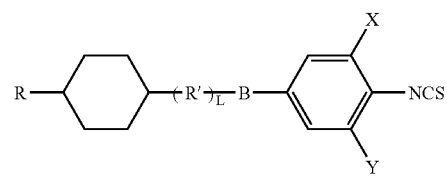

Here, R is $C_nH_{2n+1}O$, $C_nH_{2n+1}$, or $C_nH_{2n-1}$, wherein n is an integer of 1 to 15; R' is

or

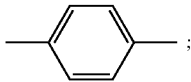

;

L is an integer of 0 to 2; B is a single bond, —$CH_2CH_2$—, —COO—, —C=C—, or —C≡C—; each of X and Y is H, F, Cl, or Br, independently or simultaneously; and at least one of X and Y is F.

The present invention also provides a nematic liquid crystal composition comprising a nematic liquid crystal compound represented by the following Chemical Formula 6:

Chemical Formula 6

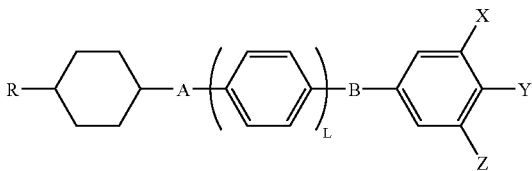

Here, R is $C_nH_{2n+}O$, $C_nH_{2n+1}O$, $C_nH_{2n+1}S$, or $C_nH_{2n-1}$, wherein n is an integer of 1 to 15; A is phenyl, phenylcyclohexane, cyclohexane-phenyl, or a single bond (—); L is 0 or 1; B is a single bond (—), $CH_2CH_2$, —COO—, —C=C—, or —C≡C—; X is H, F, Cl, or Br; Y is NCS, SCN, or F; Z is H, F, Cl, or Br; at least one of X and Z is F; and at least one of A and B is not a single bond.

The present invention also provides a nematic liquid crystal composition comprising a nematic liquid crystal compound represented by the following Chemical Formula 7:

Chemical Formula 7

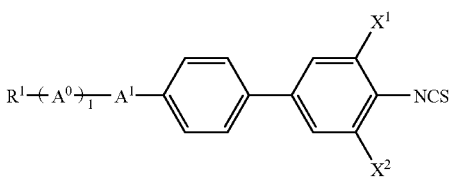

Here, $R^1$ is a $C_1$ to $C_{12}$ alkyl, wherein one or two separated $CH_2$ groups can be substituted by an oxygen atom, —CO—, —OCO—, —COO—, or —C=C— group; each of $A^0$ and $A^1$ is

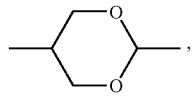

or

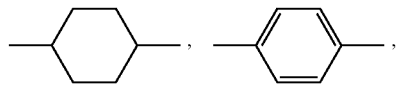

independently or simultaneously;
each of $X^1$ and $X^2$ is F, Cl, CN, or NCS, independently or simultaneously; and
I is 0 or 1.

The present invention also provides a liquid crystal display comprising any one of the above nematic liquid crystal compositions.

Preferably, the liquid crystal display is an active matrix type TN (twist nematic), STN, TFT-TN mode, IPS (in plane switching) mode, or FFS (fringe field switching) mode liquid crystal display, an AOC or COA liquid crystal display, or an OCB (optically compensated bend) mode liquid crystal display. Also, the liquid crystal display can be a passive matrix type TFT liquid crystal display.

Hereinafter, the present invention is described in more detail.

The present invention provides a nematic liquid crystal composition having a fast response time and that is capable of operating at a low voltage, which comprises a liquid crystal having a low viscosity, an increased dielectric anisotropy and birefringence index, and a wide nematic phase temperature range.

The present invention provides a nematic liquid crystal composition comprising the nematic liquid crystal compound represented by Chemical Formula 1.

The nematic liquid crystal composition of the present invention, which comprises the compound represented by Chemical Formula 1 as a key material, can have a phase transition temperature that is 18° C. or more higher than that of the conventional liquid crystals, and a response time of about 10 ms.

Physical properties of the compound represented by Chemical Formula 1 and the conventional liquid crystal compounds are compared in Table 1:

TABLE 1

| | Phase transition temperature (° C.) | Dielectric constant anisotropy | Refractive index anisotropy |
|---|---|---|---|
| Compound a | 207.3 | 16.2 | 0.274 |

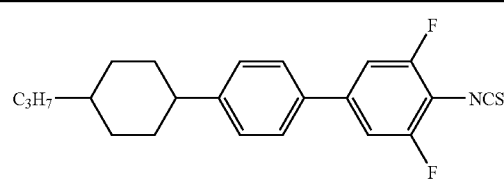

TABLE 1-continued

| | | Phase transition temperature (° C.) | Dielectric constant anisotropy | Refractive index anisotropy |
|---|---|---|---|---|
| Compound b | 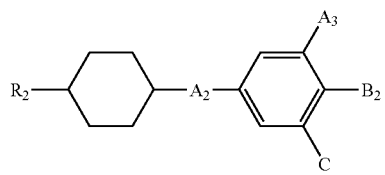 | 25 | 13 | 0.135 |
| Chemical Formula 1-1 | 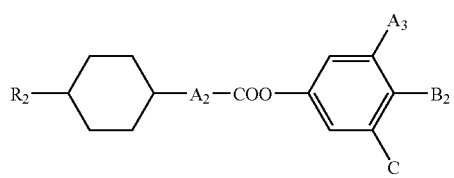 | 160.1 | 19.4 | 0.201 |

As seen in Table 1, the compound of the present invention, which is represented by Chemical Formula 1-1, has a larger dielectric constant than the conventional NCS compound (Compound a). Also, it has a phase transition temperature higher by over 100° C. and larger dielectric constant and refractive index anisotropy than the fluorine-substituted Compound b.

Therefore, the compound represented by Chemical Formula 1 can be used to manufacture low-voltage operating liquid crystal mixtures.

Preferably, the nematic liquid crystal compound represented by Chemical Formula 1 is comprised at 1 to 80 wt % of the total composition, more preferably at 1 to 30 wt %. If the content of the compound represented by Chemical Formula 1 is below 1 wt %, the response time becomes slow. Otherwise, if it exceeds 80 wt %, a high phase transition temperature cannot be obtained.

More preferably, the liquid crystal composition of the present invention further comprises one or more compounds selected from a group consisting of compounds represented by the following Chemical Formula 2, Chemical Formula 3, and Chemical Formula 4:

Chemical Formula 2

$$R_2-A_1-B_1-X_1$$

Chemical Formula 3

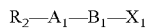

Chemical Formula 4

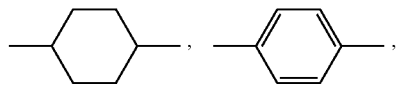

Here, each of $R_2$ is $C_nH_{2n+1}$ or $C_nH_{2n}$, independently or simultaneously, wherein n is an integer of 1 to 15;

each of $A_1$ and $B_1$ is

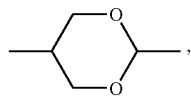

or independently or simultaneously;

$X_1$ is F, $CF_3$, $OCF_3$, $CH=CF_2$, or $OCH=CF_2$;

each of $A_2$ is

or

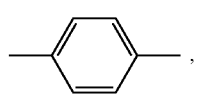

independently or simultaneously; and each of $A_3$, $B_2$, and C is F, $CF_3$, $OCF_3$, or H, independently or simultaneously.

Preferably, the compounds selected from a group consisting of compounds represented by Chemical Formula 2, Chemical Formula 3, and Chemical Formula 4 are comprised at 20 to 99 wt % of the total liquid crystal compound.

The liquid crystal composition of the present invention may further comprise a generally known nematic liquid crystal, smectic liquid crystal, or cholesteric liquid crystal to improve the liquid crystal composition properties. However, if such liquid crystal compounds are added in an excessive amount, the liquid crystal composition properties may worsen. Therefore, the addition amount should be determined according to the required properties of the nematic liquid crystal composition.

The present invention also provides a nematic liquid crystal composition comprising the nematic liquid crystal compound represented by Chemical Formula 5.

The nematic liquid crystal composition of the present invention, which comprises the compound represented by Chemical Formula 5 as a key material, can have a phase transition temperature that is 10° C. or more higher than that of the conventional liquid crystals, and a response time of about 12 ms.

The liquid crystal composition of the present invention may further comprise one or more compounds selected from a group consisting of compounds represented by Chemical Formulas 2, 3, and 4. Preferably, the nematic liquid crystal compound represented by Chemical Formula 5 is comprised at 1 to 80 wt % of the total composition, more preferably at 1 to 30 wt %. If the content of the compound represented by Chemical Formula 5 is below 1 wt %, the response time becomes slow. Otherwise, if it exceeds 80 wt %, a high phase transition temperature cannot be obtained. Preferably, the compounds selected from the compounds represented by Chemical Formula 2, Chemical Formula 3, and Chemical Formula 4 are comprised at 20 to 99 wt %.

The present invention also provides a nematic liquid crystal composition comprising a nematic liquid crystal compound represented by Chemical Formula 6.

The nematic liquid crystal composition of the present invention, which comprises the compound represented by Chemical Formula 6 as a key material, can have a phase transition temperature that is 20° C. or more higher than that of the conventional liquid crystals, and improved response time.

The liquid crystal composition of the present invention may further comprise one or more compounds selected from a group consisting of compounds represented by Chemical Formulas 2, 3, and 4. Preferably, the nematic liquid crystal compound represented by Chemical Formula 6 is comprised at 1 to 80 wt % of the total composition, more preferably at 1 to 30 wt %. If the content of the compound represented by Chemical Formula 6 is below 1 wt %, the response time becomes slow. Otherwise, if it exceeds 80 wt %, a high phase transition temperature cannot be obtained. Preferably, the compounds selected from the compounds represented by Chemical Formula 2, Chemical Formula 3, or Chemical Formula 4 are comprised at 20 to 99 wt %.

The present invention also provides a high-speed response liquid crystal composition comprising a compound represented by the following Chemical Formula 7 as a key material and that is capable of handling moving pictures, and an active matrix type liquid crystal display using the same:

Chemical Formula 7

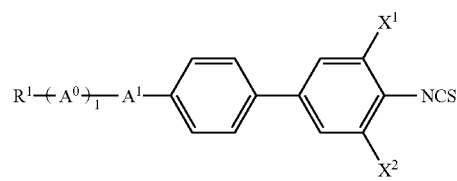

Here, $R^1$ is a $C_1$ to $C_{12}$ alkyl, wherein one or two separated $CH_2$ groups can be substituted by an oxygen atom, —CO—, —OCO—, —COO—, or —C=C— group;

each of $A^0$ and $A^1$ is

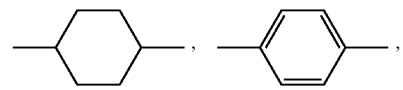

or

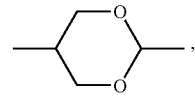

independently or simultaneously;

each of $X^1$ and $X^2$ is F, Cl, CN, or NCS, independently or simultaneously; and l is 0 or 1.

The novel liquid crystal composition of the present invention comprises more than one kind of the compound represented by Chemical Formula 7 as a key liquid crystal compound.

The liquid crystal compound represented by Chemical Formula 7 has a lower rotational viscosity (γ), higher elastic constants ($K_{11}$, $K_{33}$), higher refractive index anisotropy (Δn), and higher dielectric anisotropy (Δ∈) than the liquid crystal represented by the following Structural Formula I, which is widely used in the conventional liquid crystal displays:

Structural Formula I

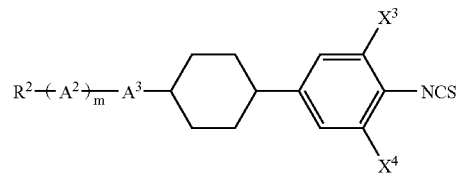

Here, $R^2$ is a $C_1$ to $C_{12}$ alkyl, wherein one or two separated $CH_2$ groups can be substituted by an oxygen atom, —CO—, —OCO—, —COO—, or —C=C— group;

each of $A^2$ and $A^3$ is

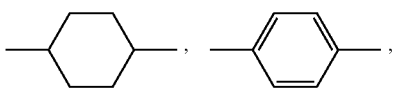

or

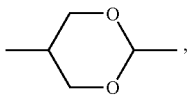

independently or simultaneously;

each of $X^3$ and $X^4$ is F, Cl, CN, or NCS, independently or simultaneously; and m is 0 or 1.

Such difference is caused by the difference in structural units.

That is, instead of a cyclohexyl group which the conventional liquid crystal contains, the liquid crystal of the present invention contains a benzene ring. Resultantly, molecular stacking becomes difficult, and thus the rotational viscosity decreases. Also, with the addition of a benzene ring which is more rigid than the cyclohexyl ring, the elastic constant increases. The decrease of rotational viscosity and increase of elastic constant reduce the response time of the liquid crystal. Also, the benzene ring of the compound of the present invention contributes to an increase in refractive index anisotropy ($\Delta n$) and dielectric anisotropy ($\Delta\epsilon$). This is very important, because an increase in threshold voltage ($V_{th}$) due to the elastic constant increase is compensated by the increased dielectric anisotropy ($\Delta\epsilon$), thereby giving a threshold voltage comparable to that of the conventional liquid crystal for a TN mode. Therefore, the structural unit (IV) of the liquid crystal of the present invention is a very useful structure, because it minimizes the trade-off characteristics and reduces the response time of the liquid crystal composition. Particularly, the cell gap of the novel liquid crystal composition, 4 μm, is suitable for the optimal $\Delta$nd and has been designed to be close to the conventional mass production condition. In such a condition, a fast response time of less than 12 ms is attained.

Preferably, the nematic liquid crystal composition of the present invention comprises a compound represented by the following Chemical Formula 8 to improve the low-temperature reliability:

Chemical Formula 8

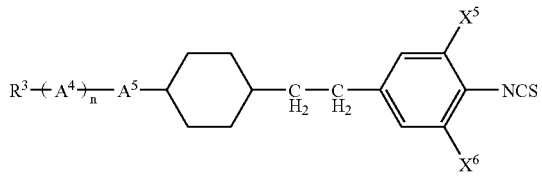

Here, $R^3$ is a $C_1$ to $C_{12}$ alkyl, wherein one or two separated $CH_2$ groups can be substituted by an oxygen atom, —CO—, —OCO—, —COO—, or —C≡C— group;

each of $A^4$ and $A^5$ is

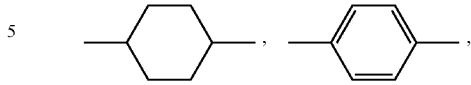

or

independently or simultaneously;

each of $X^5$ and $X^6$ is F, Cl, CN, or NCS, independently or simultaneously; and n is 0 or 1.

The liquid crystal composition of the present invention may further comprise one or more compounds selected from a group consisting of compounds represented by the following Chemical Formula 9, Chemical Formula 10, and Chemical Formula 11.

Chemical Formula 9

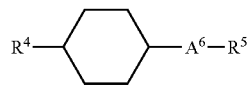

Here, $R^4$ is a $C_1$ to $C_{12}$ alkyl, and $R^5$ is a $C_1$ to $C_{12}$ alkyl or alkoxy; and $A^6$ is

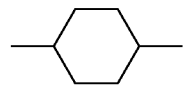

or

Chemical Formula 10

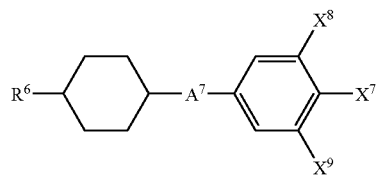

Here, $R^6$ is a $C_1$ to $C_{12}$ alkyl;
$A^7$ is

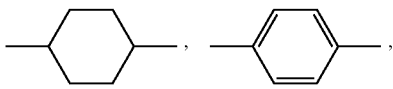

or

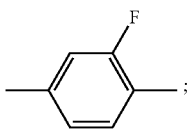

$X^7$ is H, F, Cl, or $OCH_3$; and
each of $X^8$ and $X^9$ is H, F, or Cl, independently or simultaneously.

Chemical Formula 11

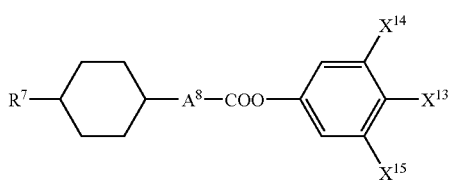

Here, $R^7$ is a $C_1$ $C_{12}$ alkyl; $A^8$ is

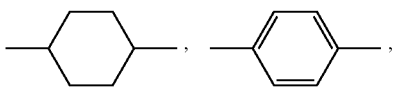

or

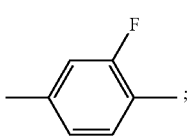

and
each of $X^{14}$, $X^{15}$, and $X^{13}$ is H, F, or Cl, independently or simultaneously.

Most preferably, the liquid crystal compound represented by Chemical Formula 7 or Chemical Formula 8 is comprised at less than 50 wt % of the total composition. Preferably, the compound represented by Chemical Formula 7 is comprised at 20 to 80 wt %, and the compound represented by Chemical Formula 8 is comprised at 20 to 80 wt %.

Preferably, the liquid crystal compounds selected from a group consisting of compounds represented by Chemical Formula 9, Chemical Formula 10, and Chemical Formula 11 is comprised at 20 to 99 wt %.

The liquid crystal composition of the present invention may further comprise a generally known nematic liquid crystal, smectic liquid crystal, or cholesteric liquid crystal to improve the liquid crystal composition properties. However, if such liquid crystal compounds are added in an excessive amount, the liquid crystal composition properties may worsen. Therefore, the addition amount should be determined according to the required properties of the nematic liquid crystal composition.

The liquid crystal composition of the present invention has a temperature range of 30° C. to +100° C., a threshold voltage of less than 1.5 V, and a dielectric anisotropy ($\Delta\in$) larger than +5. Since the nematic liquid crystal composition of the present invention has large refractive index anisotropy ($\Delta n$), elastic constants ($K_{11}$, $K_{33}$), and dielectric anisotropy ($\Delta\in$), and low rotational viscosity, it offers a fast response time. Also, it has a voltage holding ratio sufficient to be used for an active matrix type liquid crystal display.

The improved high-temperature, high-speed response property is very useful for a liquid crystal display handling moving pictures. In particular, it may offer a key material for an LCD panel, which will take the largest portion of the future LCD market.

The liquid crystal composition of the present invention can also be used usefully for an LCD having a cell gap larger than 3.0 μm. Accordingly, a liquid crystal material made from the composition of the present invention can be filled in liquid crystal cells for a variety of displays along with suitable additives to obtain various liquid crystal displays. For instance, an active matrix type TFT LCD, an active matrix type MIM LCD, an active matrix type IPS (in-plane switching) LCD, a simple matrix type TN (twist nematic) LCD, a simple matrix type STN (super twist nematic) LCD, a TFT-TN (thin film transistor-twist nematic) LCD, an AOC (array on color filter) or COA (color filter on array) LCD, and an OCB (optically compensated bend) mode LCD can be manufactured.

Hereinafter, the present invention is described in more detail through Examples and Comparative Examples. However, the following Examples are only for the understanding of the present invention, and the present invention is not limited by the following Examples.

COMPARATIVE EXAMPLE 1

The conventional mixture "GM1" (GM1=G1+G2+G3+G4) with the composition and content shown in the following Table 2 was prepared. The contents of G1 to G4 are in wt %.

TABLE 2
| Compounds | | Symbol | Contents (wt %) |
|---|---|---|---|
| G1 |  C$_3$H$_7$—...—OCF$_3$ | 3CCP$^{OCF3}$ | 2.5 |
| | 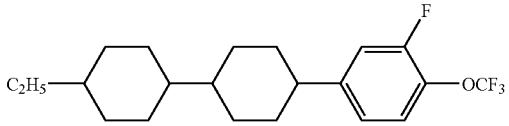 C$_2$H$_5$—...—OCF$_3$ (with F) | 2CCP$^{F.OCF}$ | 2.6 |
| |  C$_2$H$_5$—...—OCF$_3$ | 2CCP$^{OCF3}$ | 7.4 |
| | 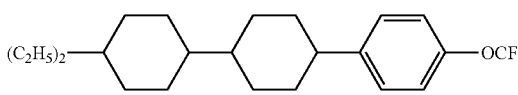 (C$_2$H$_5$)$_2$—...—OCF$_3$ | 2″CCP$^{OCF3}$ | 2.5 |
| G2 | 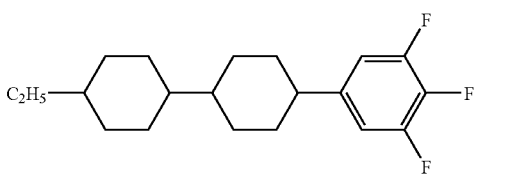 C$_2$H$_5$—...—(FFF) | 2CCP$^{FFF}$ | 7.0 |
| | 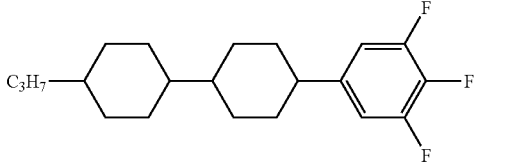 C$_3$H$_7$—...—(FFF) | 3CCP$^{FFF}$ | 2.5 |
| | 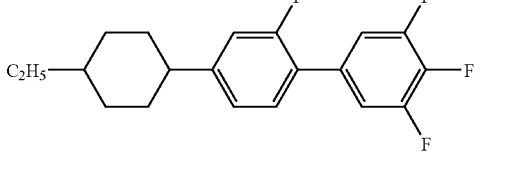 C$_2$H$_5$—...—(F, FFF) | 2CP$^F$P$^{FFF}$ | 2.9 |
| | 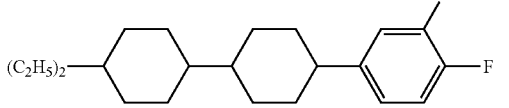 (C$_2$H$_5$)$_2$—...—(FF) | 2″CCP$^{FF}$ | 11.1 |
| G3 (X = F) |  C$_2$H$_5$—...—COO—...—X | 2CCesP$^x$ | 3.4 |
| | 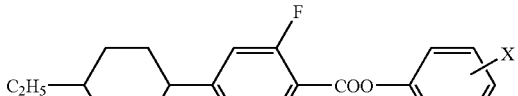 C$_2$H$_5$—...—COO—...—X (with F) | 2CP$^F$esP$^x$ | 9.0 |
| | 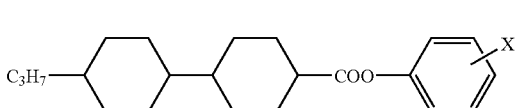 C$_3$H$_7$—...—COO—...—X | 3CCesP$^x$ | 9.4 |

TABLE 2-continued

| Compounds | Symbol | Contents (wt %) |
|---|---|---|
| G4 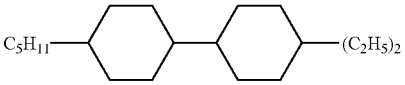 | 5CC2" | 21.8 |
| 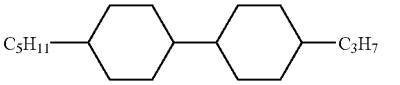 | 5CC3 | 4.1 |
| 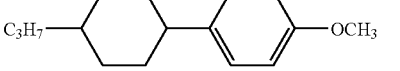 | 3CCO1 | 7.6 |
| 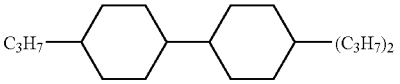 | 3CC3" | 6.2 |

The liquid crystal mixture having the composition and content of Table 2 was measured to have a response time of 16.2 ms at a cell gap of 4.5 μm, a phase transition temperature ($T_{NI}$) of 80° C., $\Delta_n$ of 0.0772, and $\Delta\epsilon$ of 5.9 (20° C.).

EXAMPLE 1

9.8 wt % of a compound represented by the following Chemical Formula 1-2 was used as a key material to prepare a liquid crystal having the composition and content of the following Table 3. Phase transition temperature, refractive index anisotropy, dielectric constant anisotropy, and response time (cell gap=3.75 μm) of the liquid crystal were measured.

Chemical Formula 1-2

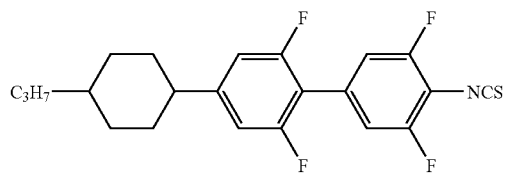

The compound represented by Chemical Formula 1-2 had a phase transition temperature ($T_{NI}$) of 136° C. (100° C.), $\Delta n$ of 0.198, and $\Delta\epsilon$ of 20.0 (20° C.).

TABLE 3

| Symbol | Contents (wt %) |
|---|---|
| Chemical Formula 1-2 | 9.8 |
| GM1 | 90.2 |

When the compound represented by Chemical Formula 1-2 was used, the phase transition temperature ($T_{NI}$) was 82° C., $\Delta n$ was 0.087, $\Delta\epsilon$ was 7.0 (25° C.), and the response time (τ) was 10.3 ms.

EXAMPLE 2

17.5 wt % of the compound represented by the following Chemical Formula 1-2 was used as a key material to prepare a liquid crystal having the composition and content of the following Table 4. Phase transition temperature, refractive index anisotropy, dielectric constant anisotropy, and response time (cell gap=3.75 μm) of the liquid crystal were measured.

TABLE 4

| Symbol | Contents (wt %) |
|---|---|
| Chemical Formula 1-2 | 17.5 |
| GM1 | 82.5 |

When the compound represented by Chemical Formula 1-2 was used, the phase transition temperature ($T_{NI}$) was 98.3° C., $\Delta n$ was 0.101, $\Delta\epsilon$ was 7.8 (25° C.), the response time (τ) was 9.8 ms, and the threshold voltage ($V_{th}$) was 1.2 V.

When the liquid crystal represented by Chemical Formula 1-2 was used, the following properties were improved. The phase transition temperature increased to 123%. Such improvement in high-temperature reliability is a very important for displays requiring the property. The dielectric anisotropy increased to about 132%, so that the low-voltage operating characteristics of the liquid crystal could be improved. This was identified from the fact that the threshold voltage decreased by 0.2 V compared to that of the liquid crystal GM1. The refractive index anisotropy increased to about 130%, and most importantly, the response time decreased to 61% compared to that of the liquid crystal GM1.

As can be seen from these results, the liquid crystal of the present invention, which comprises the compound represented by Chemical Formula 1, can be used for an LCD having a cell gap larger than 3.5 μm, and can be used for a high-speed, high-temperature liquid crystal since the low-voltage operation is possible.

COMPARATIVE EXAMPLE 2

The conventional mixture "GM2" (GM1=G1+G2+G4) with the composition and content shown in the following Table 5 was prepared. The contents of G1 to G4 are in wt %.

TABLE 5
| Compounds | | Symbol | Contents (wt %) |
|---|---|---|---|
| G1 |  | 3CCP$^{OCF3}$ | 3.2 |
| | 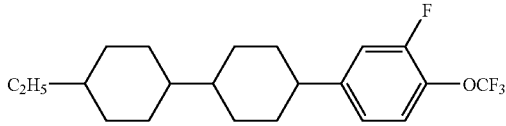 | 2CCP$^{F.OCF3}$ | 3.3 |
| |  | 2CCP$^{OCF3}$ | 9.5 |
| | 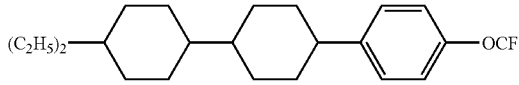 | 2"CCP$^{OCF3}$ | 3.2 |
| G2 | 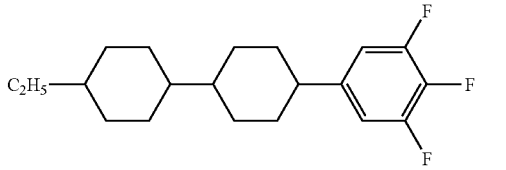 | 2CCP$^{FFF}$ | 9.0 |
| | 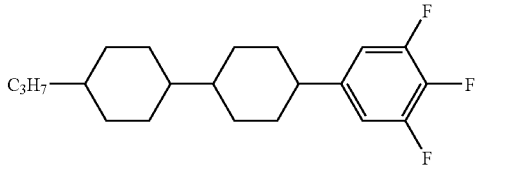 | 3CCP$^{FFF}$ | 3.2 |
| | 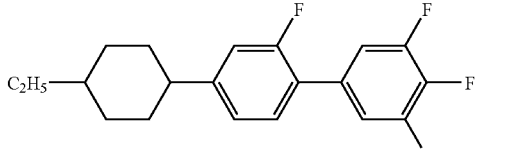 | 2CP$^F$P$^{FFF}$ | 3.7 |
| | 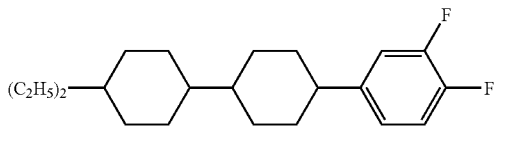 | 2"CCP$^{FF}$ | 14.2 |
| G4 | 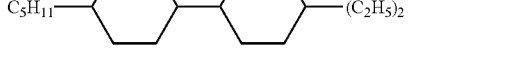 | 5CC2" | 27.9 |
| | 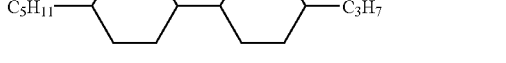 | 5CC3 | 5.2 |
| | 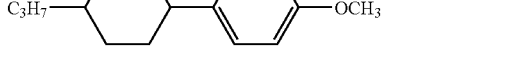 | 3CCO1 | 9.7 |
| | 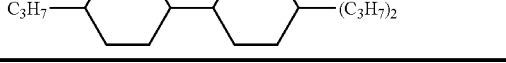 | 3CC3" | 7.9 |

The liquid crystal mixture having the composition and content of Table had a response time of 13.2 ms at a cell gap 4.4 μm, a phase transition temperature ($T_{NI}$) of 78° C., Δn of 0.0709, and Δ∈ of 4.7 (20° C.).

EXAMPLE 3

GM2 was blended with 3.3% of a compound represented by the following Chemical Formula 5-1 (3CCetPFS), 3.2% of a compound represented by the following Chemical Formula 5-2 (3CCetPFSF), 3.3% of a compound represented by the following Chemical Formula 5-3 (2CPPFS), and 3.3% of a compound represented by the following Chemical Formula 5-4 (2CPPFSF), with the composition and content given in the following Table 6, to improve the response time (at cell gap=4.4 μm) and other properties of the liquid crystal.

When 13.1% of the compound represented by Chemical Formula 5 was blended, the phase transition temperature ($T_{NI}$) was 89.4° C., Δn was 0.0922, Δ∈ was 5.0 (25° C.), and the response time (T) was 12.1 ms.

The phase transition temperature increased to 112%. The improvement in high-temperature reliability is a very important for displays requiring the property. The refractive index anisotropy increased to about 120%, so that it is suitable for operation at a cell gap of 4.0 μm. Despite the decrease of dielectric anisotropy, the response time, which is the most important factor, decreased to 75% compared to that of the liquid crystal GM1.

TABLE 6

| Compounds | | $T_{NI}$ | Δn | Δε |
|---|---|---|---|---|
| Chemical Formula 5-1 | $C_3H_7$—[Cy]—[Cy]—$CH_2CH_2$—[Ph(F)]—NCS | 189° C. (212° C.) | (0.163) | (9.8) |
| Chemical Formula 5-2 | $C_3H_7$—[Cy]—[Cy]—$CH_2CH_2$—[Ph(F,F)]—NCS | 175.2° C. (189.7° C.) | (0.169) | (14.2) |
| Chemical Formula 5-3 | $C_2H_5$—[Cy]—[Ph]—[Ph(F)]—NCS | 192.5° C. (174.1° C.) | (0.302) | (12.0) |
| Chemical Formula 5-4 | $C_2H_5$—[Cy]—[Ph]—[Ph(F,F)]—NCS | 164.8° C. (141.2° C.) | (0.285) | (15.6) |

Note)
Values in parentheses were calculated from extrapolation for the original liquid crystal.

TABLE 7

| Symbol | Contents (wt %) |
|---|---|
| Chemical Formula 5-1 | 3.3 |
| Chemical Formula 5-2 | 3.2 |
| Chemical Formula 5-3 | 3.3 |
| Chemical Formula 5-4 | 3.3 |
| 3CCP$^{OCF3}$ | 2.8 |
| 2CCP$^{F.OCF3}$ | 2.9 |
| 2CCP$^{OCF3}$ | 8.3 |
| 2"CCP$^{OCF3}$ | 2.8 |
| 2CCP$^{FFF}$ | 7.8 |
| 3CCP$^{FFF}$ | 2.8 |
| 2CpFp$^{FFF}$ | 3.2 |
| 2"CCP$^{FF}$ | 12.3 |
| 5CC2" | 24.2 |
| 5CC3 | 4.5 |
| 3CCO1 | 8.4 |
| 3CC3" | 6.9 |

EXAMPLE 4

The birefringence index, dielectric constant, and phase transition temperature of the compound represented by Chemical Formula 6 are given in the following Table 8 (n=0). In Table 8, m.p. is the transition temperature from a crystal phase to a liquid crystal phase or an isotropic liquid phase, and $T_{NI}$ is the transition temperature from a liquid crystal phase to an isotropic liquid phase. The birefringence index (Δn) and dielectric constant anisotropy (Δ∈) were determined from extrapolation by measuring the birefringence index and dielectric constant of the liquid crystal mixture comprising a host liquid crystal and 17 to 18 wt % of each compound presented in Table 8. Each compound was sufficiently purified by removing impurities through distillation, column purification, recrystallization, and so forth.

TABLE 8

|  | R | A | B | X | Y | Z | m.p. | $T_{NI}$ | $\Delta n$ | $\Delta \epsilon$ |
|---|---|---|---|---|---|---|---|---|---|---|
| Chemical Formula 6-1 | ethyl | phenyl | — | F | NCS | H | 97.8 | 192.5 | 0.302 | 12 |
| Chemical Formula 6-2 | propyl | phenyl | — | F | NCS | H | 109.7 | 227.6 | 0.288 | 14.7 |
| Chemical Formula 6-3 | butyl | phenyl | — | F | NCS | H | 87.4 | 215 | 0.274 | 11.57 |
| Chemical Formula 6-4 | pentyl | phenyl | — | F | NCS | H | 90 | 216 | 0.274 | 12.1 |
| Chemical Formula 6-5 | ethyl | phenyl | — | F | NCS | F | 49.9 | 163.8 | 0.285 | 15.6 |
| Chemical Formula 6-6 | propyl | — | cyclohexane | F | NCS | H | 81 | 237 | 0.198 | 11.7 |
| Chemical Formula 6-7 | propyl | — | cyclohexane | F | NCS | F | 65.7 | 215.7 | 0.183 | 14.1 |
| Host liquid crystal | | | | | | | −30 | 80 | 0.075 | 5.63 |

As can be seen from Table 8, the compound represented by Chemical Formula 6 has a high birefringence index, dielectric constant, and phase transition temperature. Therefore, it can be used as a high-speed response liquid crystal mixture for a low-voltage (low cell gap) LCD as a key material.

COMPARATIVE EXAMPLE 3

A host mixture GM1 (GM1=G1+G2+G3+G4) was prepared with the composition and content given in the following Table 9. The contents of G1 to G4 are in wt %.

TABLE 9

| Compounds | Contents (wt %) |
|---|---|

G1 (X = F)

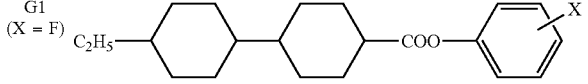

3.4

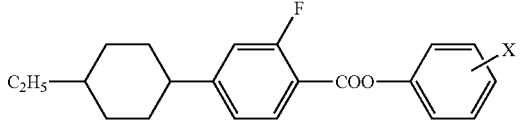

9.0

9.4

G2

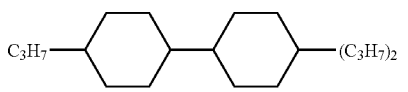

6.6

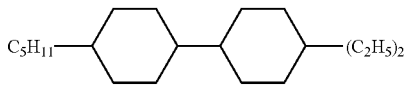

5.4

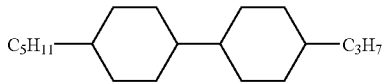

20.8

C5H11—◯—◯—C3H7

4.1

TABLE 9-continued

| Compounds | Contents (wt %) |
|---|---|
| G3  | 7.4 |
| 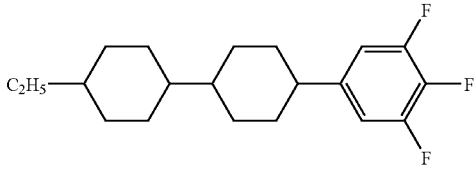 | 7.0 |
| 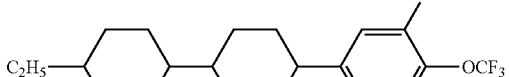 | 2.6 |
| 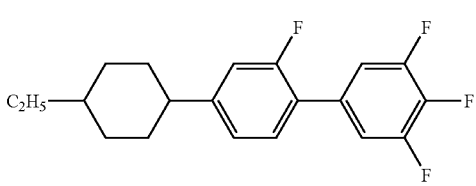 | 2.97 |
| G4 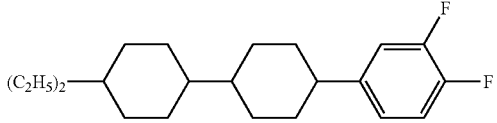 | 11.07 |
|  | 2.5 |
| 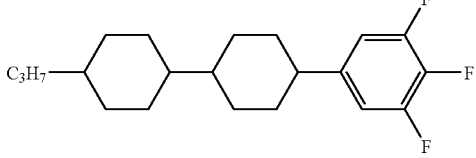 | 2.5 |

The host liquid crystal mixture, which is currently used for a liquid crystal, offered a response time of 16.2 ms at a cell gap of 4.6 µm. And, as shown in Table 8, the birefringence index was 0.075, the dielectric constant anisotropy was 5.6, and the phase transition temperature was 80° C.

EXAMPLE 5

The compound represented by Chemical Formula 6-1 was added to the host mixture as a key material to prepare a liquid crystal. Change of response time (cell gap=3.77 µm) and other physical properties depending on the % concentration was determined.

1) When 17% of the compound represented by Chemical Formula 6-1 was added to prepare a liquid crystal, the physical properties were as follows:

$T_{NI}$=96° C.; $\Delta n$=0.115, $\Delta \epsilon$=6.68 (20° C.); response time=9 ms; threshold voltage ($V_{th}$)=1.5 V; voltage holding ratio=99.4.

When 17% of the compound represented by Chemical Formula 6-1 was added, the response time decreased to 56% and the phase transition temperature increased to 120%, compared to the conventional liquid crystal. Also, since the voltage holding ratio is 99.4, it is applicable to a high-speed, high-temperature liquid crystal.

2) When 7% and 30% of the compound represented by Chemical Formula 6-1 were added respectively, the physical properties were as follows:

TABLE 10

| Contents (wt %) | $T_{NI}$ (° C.) | $\Delta n$ | $\Delta \epsilon$ (20° C.) |
|---|---|---|---|
| 7 | 87.9 | 0.0909 | 6.1 |
| 30 | 113.8 | 0.1431 | 7.5 |

From Table 10, it can be understood that the physical properties of the liquid crystal can be controlled by the content of the compound represented by Chemical Formula 6-1.

EXAMPLE 6

The compound represented by Chemical Formula 6-2 was added to the host mixture as a key material to prepare a liquid crystal. Change of response time (cell gap=3.77 µm) and other physical properties depending on the % concentration was determined.

1) When 17% of the compound represented by Chemical Formula 6-2 was added to prepare a liquid crystal, the physical properties were as follows:

$T_{NI}$=103.5° C.; $\Delta n$=0.115, $\Delta \epsilon$=7.14 (20° C.); response time=9.4 ms; threshold voltage ($V_{th}$)=1.4 V; voltage holding ratio=99.0.

When 17% of the compound represented by Chemical Formula 6-2 was added, the response time decreased to 58% and the phase transition temperature increased to 129% compared to the conventional liquid crystal. Also, since the voltage holding ratio is 99.0, it is applicable to a high-speed, high-temperature liquid crystal.

2) When 7% and 30% of the compound represented by Chemical Formula 6-2 were added respectively, the physical properties were as follows:

TABLE 11

| Contents (wt %) | $T_{NI}$ (° C.) | $\Delta n$ | $\Delta \epsilon$ (20° C.) |
| --- | --- | --- | --- |
| 7 | 90.3 | 0.0899 | 6.3 |
| 17 | 103.5 | 0.115 | 7.14 |
| 30 | 124.3 | 0.1389 | 8.4 |

From Table 11, it can be understood that the physical properties of the liquid crystal can be controlled by the content of the compound represented by Chemical Formula 6-2.

EXAMPLE 7

The compound represented by Chemical Formula 6-3 was added to the host mixture as a key material to prepare a liquid crystal. Change of response time (cell gap=3.77 µm) and other physical properties depending on the % concentration was determined.

1) When 17.7% of the compound represented by Chemical Formula 6-3 was added to prepare a liquid crystal, the physical properties were as follows:

$T_{NI}$=101.5° C.; $\Delta n$=0.111, $\Delta \epsilon$=6.65 (20° C.); response time=9.9 ms; threshold voltage ($V_{th}$)=1.5 V; voltage holding ratio=99.1.

When 17.7 wt % of the compound represented by Chemical Formula 6-3 was added, the response time decreased to 61% and the phase transition temperature increased to 127% compared to the conventional liquid crystal. Also, since the voltage holding ratio is 99.1, it is applicable to a high-speed, high-temperature liquid crystal.

2) When 7% and 30% of the compound represented by Chemical Formula 6-3 were added respectively, the physical properties were as follows:

TABLE 12

| Contents (wt %) | $T_{NI}$ (° C.) | $\Delta n$ | $\Delta \epsilon$ (20° C.) |
| --- | --- | --- | --- |
| 7 | 89.5 | 0.0899 | 6.0 |
| 17.7 | 101.5 | 0.111 | 6.65 |
| 30 | 120.5 | 0.1347 | 7.4 |

From Table 12, it can be understood that the physical properties of the liquid crystal can be controlled by the content of the compound represented by Chemical Formula 6-3.

EXAMPLE 8

The compound represented by Chemical Formula 6-4 was added to the host mixture as a key material to prepare a liquid crystal. Change of response time (cell gap=3.77 µm) and other physical properties depending on the % concentration was determined.

1) When 17.7% of the compound represented by Chemical Formula 6-4 was added to prepare a liquid crystal, the physical properties were as follows:

$T_{NI}$=102° C.; $\Delta n$=0.111, $\Delta \epsilon$=6.41 (20° C.); response time=11 ms; threshold voltage ($V_{th}$)=1.4 V; voltage holding ratio=99.1.

When 17.7 wt % of the compound represented by Chemical Formula 6-4 was added, the response time decreased to 68% and the phase transition temperature increased to 128% compared to the conventional liquid crystal. Also, since the voltage holding ratio is 99.1, it is applicable to a high-speed, high-temperature liquid crystal.

2) When 7% and 30% of the compound represented by Chemical Formula 6-4 were added respectively, the physical properties were as follows:

TABLE 13

| Contents (wt %) | $T_{NI}$ (° C.) | $\Delta n$ | $\Delta \epsilon$ (20° C.) |
| --- | --- | --- | --- |
| 7 | 89.5 | 0.0899 | 6.1 |
| 30 | 120.8 | 0.1347 | 7.6 |

From Table 13, it can be understood that the physical properties of the liquid crystal can be controlled by the content of the compound represented by Chemical Formula 6-4.

COMPARATIVE EXAMPLE 4

The content of the host liquid crystal was changed as follows:

trans,trans-4-ethyl-4'-pentylbicyclohexane: 21%
trans,trans-4-propyl-4'-pentylbicyclohexane: 4%
1-methoxy-(p-trans-4-propylcyclohexyl)benzene: 7%
trans,trans-4-propyl-4'-propylbicyclohexane: 5%
[trans-4-(trans-4-ethylcyclohexyl)cyclohexyl]trifluoromethoxybenzene: 7%
[trans-4-(trans-4-ethylcyclohexyl)cyclohexyl]-1,2,6-trifluorobenzene: 7%
[trans-4-(trans-4-ethylcyclohexyl)cyclohexyl]-2-fluoro-1-trifluoromethoxybenzene: 4%
[trans-4-(trans-4-ethylcyclohexyl)-2-fluorophenyl]-1,2,6-trifluorobenzene: 4%
[trans-4-(trans-4-ethylcyclohexyl)cyclohexyl]-1,2-difluorobenzene: 11%

[trans-4-(trans-4-ethylcyclohexyl)cyclohexyl]4-fluorophenylcarboxylate: 4%
[4-(trans-4-ethylcyclohexyl)-2-fluorophenyl]4-fluorophenylcarboxylate: 9%
[trans-4-(trans-4-propylcyclohexyl)cyclohexyl]trifluoromethoxybenzene: 4%
[trans-4-(trans-4-propylcyclohexyl)cyclohexyl]-1,2,6-trifluorobenzene: 4%
[trans-4-(trans-4-propylcyclohexyl)cyclohexyl]4-fluorophenylcarboxylate: 9%

This host liquid crystal mixture, which is also currently available for a liquid crystal, offered a response time of 16.2 ms at a cell gap of 4.6 μm. However, because the response time is 25 ms in the actual panel, it cannot handle moving pictures.

EXAMPLE 9

The content of the host liquid crystal was changed as follows. Then, 17% of the compound represented by Chemical Formula 6-1 was added, and the physical properties were measured. The result is shown in Table 14. The contents are in wt % unit.

trans,trans-4-ethyl-4'-pentylbicyclohexane: 17.43%
trans, trans-4-propyl-4'-pentylbicyclohexane: 3.32%
1-methoxy-(p-trans-4-propylcyclohexyl)benzene: 5.81%
trans,trans-4-propyl-4'-propylbicyclohexane: 4.15%
[trans-4-(trans-4-ethylcyclohexyl)cyclohexyl]trifluoromethoxybenzene: 5.81%
[trans-4-(trans-4-ethylcyclohexyl)cyclohexyl]-1,2,6-trifluorobenzene: 5.81%
[trans-4-(trans-4-ethylcyclohexyl)cyclohexyl]-2-fluoro-1-trifluoromethoxybenzene: 3.32%
[trans-4-(trans-4-ethylcyclohexyl)-2-fluorophenyl]-1,2,6-trifluorobenzene: 3.32%
[trans-4-(trans-4-ethylcyclohexyl)cyclohexyl]-1,2-difluorobenzene: 9.13%
[trans-4-(trans-4-ethylcyclohexyl)cyclohexyl]-4-fluorophenylcarboxylate: 3.32%
[4-(trans-4-ethylcyclohexyl)-2-fluorophenyl]-4-fluorophenylcarboxylate: 7.47%
[trans-4-(trans-4-propylcyclohexyl)cyclohexyl]trifluoromethoxybenzene: 3.32%
[trans-4-(trans-4-propylcyclohexyl)cyclohexyl]-1,2,6-trifluorobenzene: 3.32%
[trans-4-(trans-4-propylcyclohexyl)cyclohexyl]-4-fluorophenylcarboxylate: 7.47%

TABLE 14

| $T_{NI}$ (° C.) | $\Delta n$ | $\Delta \epsilon$ | Response time (ms) | V10 (volt) | V90 (volt) |
|---|---|---|---|---|---|
| 96 | 0.115 | 6.68 | 9 | 1.5 | 2.6 |

The composition of the present invention has physical properties sufficient to be applied to a cell gap of 3.5 to 3.7 μm. The response time decreased to 56% and the phase transition temperature increased to 120% compared to the host. Also, since the voltage holding ratio is 99.4%, it can be used for a high-speed, high-temperature liquid crystal.

When the content of the compound represented by Chemical Formula 6-1 was changed to 7% and 30%, respectively, the physical properties were as follows:

7%: $T_{NI}$=87.9° C., $\Delta n$=0.0909, $\Delta \epsilon$=6.1 (20° C.)

30%: $T_{NI}$=113.8° C., $\Delta n$=0.1431, $\Delta \epsilon$=7.5 (20° C.)

EXAMPLE 10

The content of the host liquid crystal was changed as follows. Then, 2.2% of the compound represented by Chemical Formula 6-1, 2.3% of the compound represented by Chemical Formula 6-2, 2.2% of the compound represented by Chemical Formula 6-3, and 2.3% of the compound represented by Chemical Formula 6-4 were added to prepared a liquid crystal. The physical properties measurement result is given in the following Table 15.

trans,trans-4-ethyl-4'-pentylbicyclohexane: 19.11%
trans,trans-4-propyl-4'-pentylbicyclohexane: 3.64%
1-methoxy-(p-trans-4-propylcyclohexyl)benzene: 6.37%
trans,trans-4-propyl-4'-propylbicyclohexane: 4.55%
[trans-4-(trans-4-ethylcyclohexyl)cyclohexyl]trifluoromethoxybenzene: 6.37%
[trans-4-(trans-4-ethylcyclohexyl)cyclohexyl]-1,2,6-trifluorobenzene: 6.37%
[trans-4-(trans-4-ethylcyclohexyl)cyclohexyl]-2-fluoro-1-trifluoromethoxybenzene: 3.64%
[trans-4-(trans-4-ethylcyclohexyl)-2-fluorophenyl]-1,2,6-trifluorobenzene: 3.64%
[trans-4-(trans-4-ethylcyclohexyl)cyclohexyl]-1,2-difluorobenzene: 10.01%
[trans-4-(trans-4-ethylcyclohexyl)cyclohexyl]-4-fluorophenylcarboxylate: 3.64%
[4-(trans-4-ethylcyclohexyl)-2-fluorophenyl]-4-fluorophenylcarboxylate: 8.19%
[trans-4-(trans-4-propylcyclohexyl)cyclohexyl]trifluoromethoxybenzene: 3.64%
[trans-4-(trans-4-propylcyclohexyl)cyclohexyl]-1,2,6-trifluorobenzene: 3.64%
[trans-4-(trans-4-propylcyclohexyl)cyclohexyl]-4-fluorophenylcarboxylate: 8.19%

TABLE 15

| $T_{NI}$ (° C.) | $\Delta n$ | $\Delta \epsilon$ | Response time (ms) | V10 (volt) | V90 (volt) |
|---|---|---|---|---|---|
| 90 | 0.0912 | 6.6 | 11.8 | 1.5 | 2.6 |

Since the composition of the present invention has physical properties superior to those of the conventional liquid crystal, it can be used as a high-speed liquid crystal composition for a cell gap of 4 μm. Because the conventional NCS mixture had $T_{NI}$ of 71° C., $\Delta n$ of 0.15, a response time of 14.6 ms, a low phase transition temperature, and a high refractive index, it was difficult to put into practical use. Also, the conventional liquid crystal having $T_{NI}$ of 95° C., $\Delta n$ of 0.089, and a response time of 21.3 ms cannot be used for a high-speed, high-temperature liquid crystal for handling moving pictures.

However, every composition of the present invention satisfies the high-speed and high-temperature requirements for handling moving pictures, and stands a good chance of producibility.

EXAMPLE 11

The conventional original liquid crystal used for a TN mode was prepared with the following composition and content, in order to prepare a novel liquid crystal composition. The contents are in wt % units.

1-methoxy-(p-trans-4-propylcyclohexyl)benzene: 7%
trans,trans-4-propyl-4'-propylbicyclohexane: 5.5%
trans,trans-4-ethyl-4'-pentylbicyclohexane: 22%
trans,trans-4-propyl-4'-pentylbicyclohexane: 4%

[trans-4-(trans-4-ethylcyclohexyl)cyclohexyl]trifluoromethoxybenzene: 7.5%

[trans-4-(trans-4-ethylcyclohexyl)cyclohexyl]-1,2,6-trifluorobenzene: 7%

[trans-4-(trans-4-ethylcyclohexyl)cyclohexyl]-2-fluoro-1-trifluoromethoxybenzene: 3.5%

[trans-4-(trans-4-ethylcyclohexyl)-2-fluorophenyl]-1,2,6-trifluorobenzene: 3.5%

[trans-4-(trans-4-ethylcyclohexyl)cyclohexyl]-1,2-difluorobenzene: 11.5%

[trans-4-(trans-4-propylcyclohexyl)cyclohexyl]trifluoromethoxybenzene: 3%

[trans-4-(trans-4-propylcyclohexyl)cyclohexyl]-1,2,6-trifluorobenzene: 3%

[trans-4-(trans-4-ethylcyclohexyl)cyclohexyl]-4-fluorophenylcarboxylate: 3.5%

[4-(trans-4-ethylcyclohexyl)-2-fluorophenyl]-4-fluorophenylcarboxylate: 9.5%

[trans-4-(trans-4-propylcyclohexyl)cyclohexyl]-4-fluorophenylcarboxylate: 9.5%

The conventional liquid crystal had an isotropization temperature ($T_{NI}$) of 80° C., a refractive index anisotropy ($\Delta n$) of 0.076, a dielectric anisotropy ($\Delta\varepsilon$) of 5.6, a threshold voltage ($V_{th}$) of 1.4 V, and a response time at a test cell of about 15 ms.

Then, 17 wt % of a compound represented by the following Chemical Formula 7-1 was added to the original liquid crystal to prepare a liquid crystal composition:

Chemical Formula 7-1

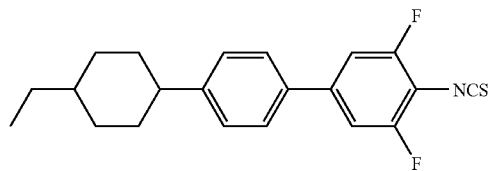

The resultant novel liquid crystal had the following physical properties:

Isotropization temperature ($T_{NI}$)=90.4° C., refractive index anisotropy ($\Delta n$)=0.112, dielectric anisotropy ($\Delta\varepsilon$)=7.30, threshold voltage ($V_{th}$)=1.4 V, response time=9.5 ms, and VHR=99.3%.

The liquid crystal comprising the compound of the present invention had an isotropization temperature about 25% higher than that of the conventional liquid crystal. This improvement in high-temperature reliability will offer a great advantage in application to LCD-TVs, car navigation systems, and so forth, which require the property. Also, since the dielectric anisotropy is increased by about 30%, the low-voltage operating characteristics of the liquid crystal can be improved. The refractive index anisotropy increased by about 15%, and the threshold voltage ($V_{th}$) was almost the same compared to the conventional liquid crystal. Most importantly, the response time was about 9 to 10 ms, which is about 50% faster than that of the conventional liquid crystal.

EXAMPLE 12

The procedure of Example 11 was carried out, doping 10 wt % of the compound represented by Chemical Formula 7 and the compound represented by Chemical Formula 8, respectively.

The liquid crystal of the present invention had an isotropization temperature about 11% higher than that of the conventional liquid crystal. This improvement in high-temperature reliability will offer a great advantage in application to LCD-TVs, car navigation systems, and so forth, which require the property. Also, since the dielectric anisotropy is increased by about 14%, the low-voltage operating characteristics of the liquid crystal can be improved. The refractive index anisotropy increased by about 20%, and the threshold voltage ($V_{th}$) was almost the same compared to the conventional liquid crystal. Most importantly, the response time in a test cell was about 12 ms, which is about 20% faster than that of the conventional liquid crystal. If the measurement is done for a test cell having a $\Delta nd$ value suitable for the newly developed liquid crystal composition, the response time will become about 1 to 2 ms faster.

EXAMPLE 13

The procedure of Example 11 was carried out, adding 17.5 wt % of the compound represented by the following Chemical Formula 7-2, to prepare a liquid crystal composition:

Chemical Formula 7-2

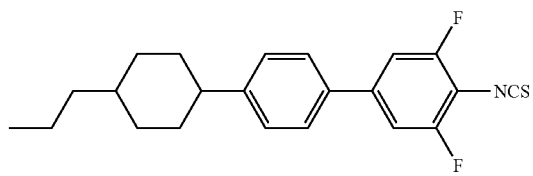

The resultant novel liquid crystal had the following physical properties:

Isotropization temperature ($T_{NI}$)=101.1° C., refractive index anisotropy ($\Delta n$)=0.113, dielectric anisotropy ($\Delta\varepsilon$)=7.46, threshold voltage ($V_{th}$)=1.4 V, response time=9.7 ms, and VHR=98.7%.

EXAMPLE 14

The procedure of Example 11 was carried out, adding 17.6 wt % of the compound represented by the following Chemical Formula 7-3, to prepare a liquid crystal composition:

Chemical Formula 7-3

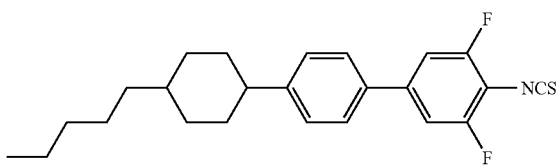

The resultant novel liquid crystal had the following physical properties:

Isotropization temperature ($T_{NI}$)=101.1° C., refractive index anisotropy ($\Delta n$)=0.111, dielectric anisotropy ($\Delta\varepsilon$)=6.91, threshold voltage ($V_{th}$)=1.5 V, response time=10.1 ms, and VHR=95.4%.

EXAMPLE 15

The procedure of Example 11 was carried out, adding the following compounds, to prepare a liquid crystal composition:

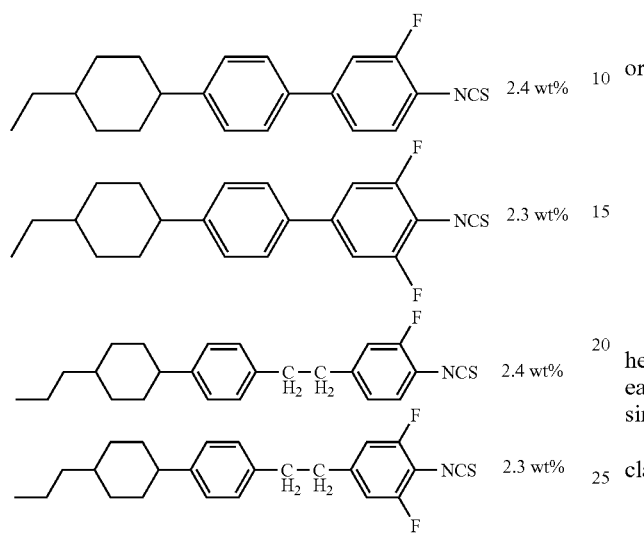

The resultant novel liquid crystal had the following physical properties:

Isotropization temperature ($T_{NI}$)=88.8° C., refractive index anisotropy ($\Delta n$)=0.0901, dielectric anisotropy ($\Delta \in$)=6.4, threshold voltage ($V_{th}$)=1.5 V, response time=12.2 ms, and VHR=99.3%.

As described above, the liquid crystal composition for handling moving pictures according to the present invention has higher birefringence index ($\Delta n$) and dielectric constant anisotropy ($\Delta \in$), lower threshold voltage ($V_{th}$) and lower viscosity, compared to the conventional liquid crystal mixture. Therefore, it can offer a high-speed response. And, since the low-voltage operation is possible, it can be used for a variety of devices requiring liquid crystals, such as an LCD.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A nematic liquid crystal composition comprising a nematic liquid crystal compound represented by the following Chemical Formula 5:

Chemical Formula 5

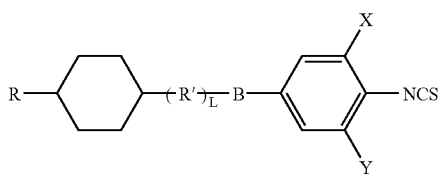

wherein: R is $C_nH_{2n+1}O$, $C_nH_{2n+1}$, or $C_nH_{2n-1}$, wherein n is an integer of 1 to 15; R' is

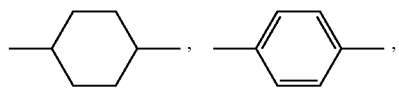

or

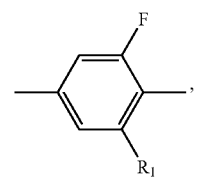

here $R_1$ is H or F; L is an integer of 0 to 2; B is —C≡C—; each of X and Y is H, F, Cl, or Br, independently or simultaneously; and at least one of X and Y is F.

2. The nematic liquid crystal composition according to claim 1, which comprises:
   a) 1 to 80 wt % of the nematic liquid crystal compound represented by Chemical Formula 5; and
   b) 20 to 99 wt % of one or more liquid crystal compounds selected from a group consisting of the compounds represented by the following Chemical Formula 2, Chemical Formula 3, and Chemical Formula 4:

Chemical Formula 2

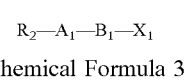

Chemical Formula 3

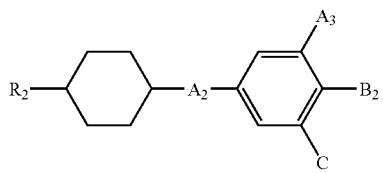

Chemical Formula 4

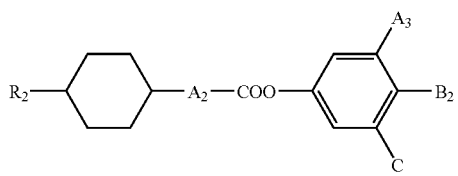

wherein:
each of $R_2$ is $C_nH_{2n+1}$ or $C_nH_{2n}$, independently or simultaneously, wherein n is an integer of 1 to 15,;
each of $A_1$ and $B_1$ is ,

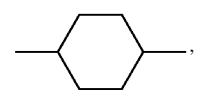

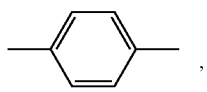, or

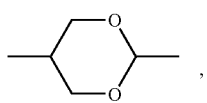, independently or simultaneously;
X$_1$ is F, CF$_3$, OCF$_3$, CH=CF$_2$, or OCH=CF$_2$;
each of A$_2$ is

or

, independently or simultaneously; and each of A$_3$, B$_2$, and C is F, CF$_3$, OCF$_3$, or H, independently or simultaneously.

3. A nematic liquid crystal composition comprising a nematic liquid crystal compound represented by the following Chemical Formula 6:

Chemical Formula 6

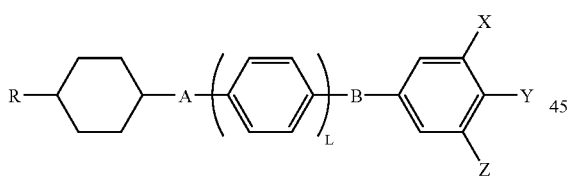

wherein: R is C$_n$H$_{2n+1}$O, C$_n$H$_{2n+1}$, C$_n$H$_{2n+1}$S, or C$_n$H$_{2n-1}$, wherein n is an integer of 1 to 15; A is phenyl, phenyl-cyclohexane, cyclohexane-phenyl, or a single bond (—); L is 0 or 1; B is —C≡C—; X is H, F, Cl, or Br; Y is NCS, SCN, or F; Z is H, F, Cl, or Br; at least one of X and Z is F; and at least one of A and B is not a single bond.

4. The nematic liquid crystal composition according to claim 3, which comprises:
  a) 1 to 80 wt % of the nematic liquid crystal compound represented by Chemical Formula 6; and
  b) 20 to 99 wt % of one or more liquid crystal compounds selected from a group consisting of the compounds represented by the following Chemical Formula 2, Chemical Formula 3, and Chemical Formula 4:

Chemical Formula 2

Chemical Formula 3

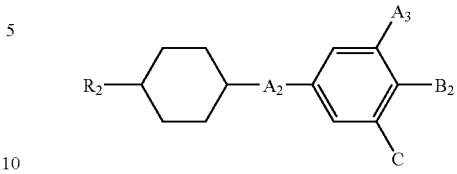

Chemical Formula 4

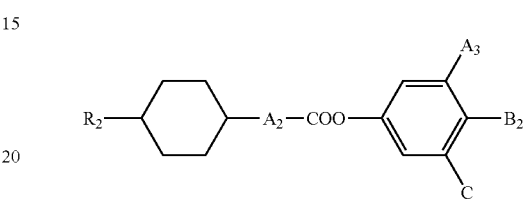

wherein:
each of R$_2$ is C$_n$H$_{2n+1}$, or C$_n$H$_{2n}$, independently or simultaneously, wherein n is an integer of 1 to 15;
each of A$_1$ and B$_1$ is

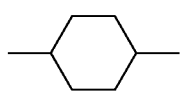

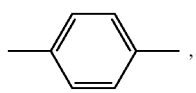, or

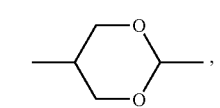, independently or simultaneously;
X$_1$ is F, CF$_3$, OCF$_3$, CH=CF$_2$, or OCH=CF$_2$;
each of A$_2$ is

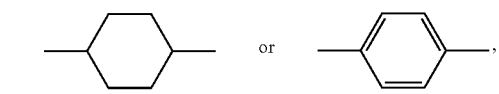, independently or simultaneously; and
each of A$_3$, B$_2$ and C is F, CF$_3$, OCF$_3$, or H, independently or simultaneously.

5. A nematic liquid crystal composition comprising a nematic liquid crystal compound represented by the following Chemical Formula 7:

Chemical Formula 7

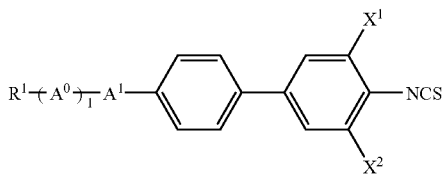

wherein:
$R^1$ is a $C_1$ to $C_{12}$ alkyl, wherein one or two separated $CH_2$ groups can be substituted by an oxygen atom, —CO—, —OCO—, —COO—, or —C=C— group;
each of $A^0$ and $A^1$ is

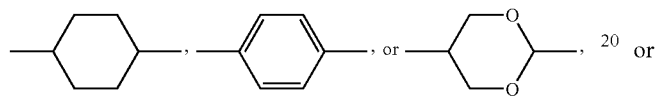

independently or simultaneously;
each of $X^1$ and $X^2$ is F, Cl, CN, or NCS, independently or simultaneously; and 1 is 1.

6. The nematic liquid crystal composition according to claim 5, which comprises:
a) 20 to 80 wt % of the nematic liquid crystal compound represented by Chemical Formula 7; and
b) 20 to 80 wt % of a nematic liquid crystal compound represented by the following Chemical Formula 8:

Chemical Formula 8

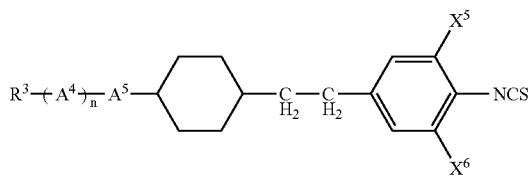

wherein:
$R^3$ is a $C_1$ to $C_{12}$ alkyl; wherein one or two separated $CH_2$ groups can be substituted by an oxygen atom, —CO—, —OCO—, —COO—, or —C=C— group;
each of $A^4$ and $A^5$ is

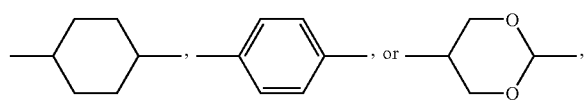

independently or simultaneously;
each of $X^5$ and $X^6$ is F, Cl, CN, or NCS, independently or simultaneously; and
n is 0 or 1.

7. The nematic liquid crystal composition according to claim 5, which further comprises:
c) one or more compounds selected from a group consisting of the nematic liquid crystal compounds represented by the following Chemical Formula 10 and Chemical Formula 11:

Chemical Formula 10

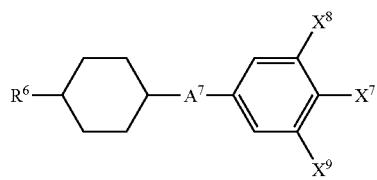

wherein:
$R^6$ is a $C_1$ to $C_{12}$ alkyl;

$A^7$ is 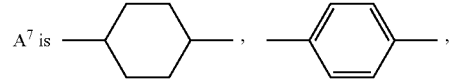

or

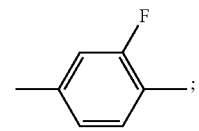

$X^7$ is H, F, Cl, or $OCH_3$; and
each of $X^8$ and $X^9$ is H, F, or Cl, independently or simultaneously; and Chemical Formula 11

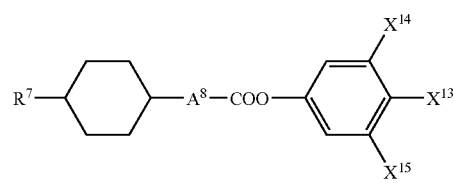

wherein:
$R^7$ is a $C_1$ to $C_{12}$ alkyl;
$A^8$ is

or

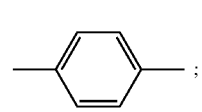

and
each of $X^{14}$, $X^{15}$ and $X^{13}$ is H, F, or Cl, independently or simultaneously.

8. A liquid crystal display comprising the nematic liquid crystal composition according to claim 1.

9. The liquid crystal display according to claim 8, which is an active matrix type TN (twist nematic), STN, OCB, TFT-TN mode liquid crystal display, or an IPS (in plane switching) mode or FFS (fringe field switching) mode liquid crystal display.

10. The liquid crystal display according to claim 8, which is an AOC or COA liquid crystal display, or an OCB (optically compensated bend) mode liquid crystal display.

11. A liquid crystal display comprising the nematic liquid crystal composition according to claim 3.

12. The liquid crystal display according to claim 11, which is an active matrix type TN (twist nematic), STN, OCB, TFT-TN mode liquid crystal display, or an IPS (in plane switching) mode or FFS (fringe field switching) mode liquid crystal display.

13. The liquid crystal display according to claim 11, which is an AOC or COA liquid crystal display, or an OCB (optically compensated bend) mode liquid crystal display.

14. A liquid crystal display comprising the nematic liquid crystal composition according to claim 5.

15. The liquid crystal display according to claim 14, which is an active matrix type TN (twist nematic), STN, OCB, TFT-TN mode liquid crystal display, or an IPS (in plane switching) mode or FFS (fringe field switching) mode liquid crystal display.

16. The liquid crystal display according to claim 14, which is an AOC or COA liquid crystal display, or an OCB (optically compensated bend) mode liquid crystal display.

17. A nematic liquid crystal composition, comprising:
a nematic liquid crystal compound represented by the following Chemical Formula 7:
Chemical Formula 7

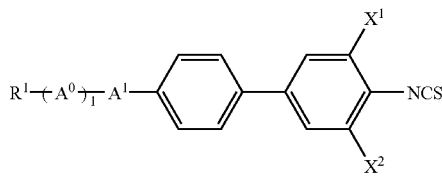

wherein:
$R^1$ is a $C_1$ to $C_{12}$ alkyl, wherein one or two separated $CH_2$ groups can be substituted by a compound or compounds selected from the group consisting of a oxygen atom, —CO—, —OCO—, —COO—, and —C=C— group;
each of $A^0$ and $A^1$ is selected from the group consisting of

,

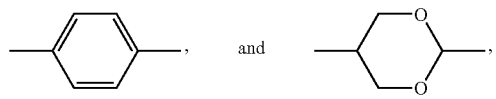

independently or simultaneously;

each of $X^1$ $X^2$ is F, Cl, CN, or NCS, independently or simultaneously;
l is 0 or 1; and
one or more compounds selected from a group consisting of the nematic liquid crystal compounds represented by the following Chemical Formula 9:
Chemical Formula 9

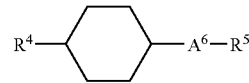

wherein:
$R^4$ is a $C_1$ $C_{12}$ alkyl, and $R^5$ is a $C_1$ to $C_{12}$ alkyl or alkoxy; and
$A^6$ is

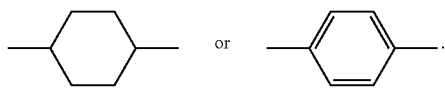

18. A liquid crystal display comprising the nematic liquid crystal composition of claim 17.

19. The liquid crystal display of claim 18, wherein the LCD has a mode selected from the group consisting of an active matrix type TN (twist nematic), a STN, an OCB, a TFT-TN, an IPS (in plane switching) and a FFS (fringe field switching).

20. The liquid crystal display of claim 18, wherein the LCD had a mode selected from the group consisting of an AOC, COA, and an OCB (optically compensated birefringence).

21. The nematic liquid crystal composition of claim 17, wherein the composition had a refractive index anisotropy in a range of about 0.07 to about 0.1.

22. The nematic liquid crystal composition of claim 17, wherein the composition is in a nematic phase at a temperature in a range of about −20° C. to about 80° C.

23. The nematic liquid crystal composition of claim 17, wherein the composition has an electric resistance greater than about $10^{12}$ Ωcm.

24. The nematic liquid crystal composition of claim 17, wherein the composition has a threshold voltage in a range of about 1.5 to about 2.0 V which is defined by the following equation $$V_{th} = \pi \sqrt{\frac{K}{\varepsilon_0 \Delta \varepsilon}} \qquad \text{Equation 1}$$

wherein $V_{th}$ is the threshold voltage, $\Delta \in$ is the dielectric constant, anisotropy, and K is the modulus of elasticity.

25. The liquid crystal display of claim 18, wherein the LCD has a response time less than about 10 ms.

* * * * *